Figure 1:
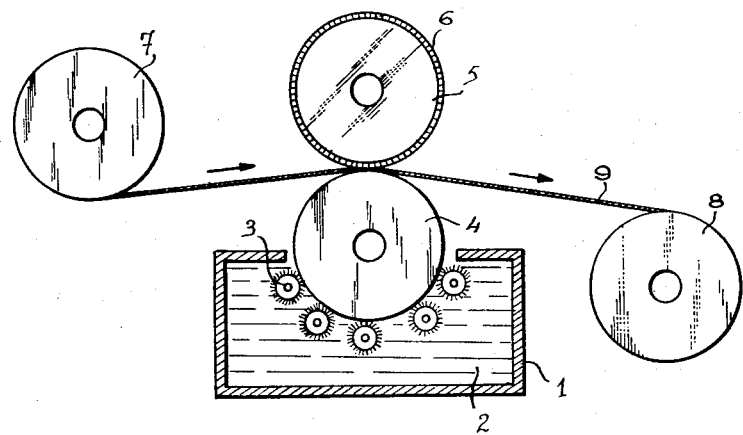

United States Patent Office 3,256,102
Patented June 14, 1966

3,256,102
METHOD OF PREPARING SOLUBLE SOLID DYE ELEMENTS FOR MULTICOLOR PRINTING
Astra Sark born Arounowa, 20 Blvd. Princesse Charlotte, Monte Carlo, Monaco
Filed Feb. 14, 1964, Ser. No. 345,012
Claims priority, application France, Sept. 26, 1961, 874,149
1 Claim. (Cl. 106—19)

This invention relates to soluble solid dye elements for printing in polychrome.

This application is a continuation in part of my copending applications Serial No. 226,197, filed on Sept. 24, 1962, entitled "Dye Stuffs Used For Printing," and Serial No. 128,525, filed on Aug. 1, 1961, and entitled "Pattern Transfer Machine," which applications are now abandoned.

In processes for printing in polychrome, known under the name of "multicolor printing process," a flat or cylindrical pattern member is used, consisting of solid soluble dye elements of different colors, arranged according to a desired pattern which is to be imprinted, which pattern member produces a multicolored impression in a single operation after preliminary moistening of the pattern member with a solvent. The obtained impression is then fixed, i.e. rendered insoluble by a steam or chemical treatment.

The composition of these dye elements depends on the one hand on the nature and the structure of the surface to be imprinted, which might be made of fabric, leather, paper or wood, and on the other on the desired quality of the impression, such as fastness and resistance to washing, rubbing, heat and light. Said dye elements essentially comprise coloring agents, chemical adjuvants, binders and thickening agents.

Normally the binders and thickening agents used in known dye compositions are natural or synthetic gums and solubilized starches, which are disadvantageous in as much as they are rather costly, that their solubilization is time-consuming and that their quality varies. The consistency of the dye compositions comprising the above constituents is thus variable, and they tend to crumble and dry out when stored. Their yield is very limited owing to the lack of fineness of the paste, they are not instantaneously soluble and the colors of the impressions obtained are lustreless.

The present invention relates to novel solid, soluble dye elements for multicolor printing, wherein the above disadvantages are overcome. The dye elements according to the invention are characterized by the fact that they contain a polyethylene glycol having a molecular weight of at least 400, and preferably in the range between approximately 400 and 4,000 or more, in addition to the usual ingredients such as conventional coloring agents, chemical adjuvants, binders and thickening agents.

Polyethylene glycol is preferably used in an amount of from 10–50% by weight of the final dye composition.

The incorporation of polyethylene glycol having a molecular weight selected from the range as specified hereinbefore, to dye compositions intended for printing in polychrome leads to numerous unexpected advantages. The dye elements according to the invention are instantaneously soluble, they produce instantaneous impressions and they entirely dye the fibers of the fabric to be imprinted. Consequently the imprinting of fabrics with the dye elements according to the invention is a true dyeing process which brings about a considerable advance in the art.

Moreover the novel dye compositions are characterized by a very great fineness which allows of producing a higher number of impressions than with conventional dyes.

Furthermore preparation of the novel dye elements is facilitated since the grinding and kneading operations can be carried out in the cold state.

In view of the fact that the consistency of the polyethylene glycol varies within the specified range of molecular weights, i.e. it is in a liquid state at a molecular weight of 400, and it is in a solid state at a molecular weight of 4,000, and passes through the creamy and pasty state at the intermediate molecular weights, it is possible to give the dye elements a desired consistency, varying from the plastic state to the rigid state (controllable hardness), and to select the required configuration, such as powder, granulates, threads, plates, blocks, etc.

The coloring agents used in the preparation of the novel dye elements are those normally used in the manufacture of conventional dyes for multicolor printing, e.g. soluble coloring agents such as acid, basic or mordant dyes, insoluble coloring agents such as vat dyes, induced dyes (indigoid, indanthrene), soluble dyes (indigosols), or derivatives of Naphtol AS, dispersion and microdispersion dyes, coloring pigments and the like.

Depending on the specific case, the following acids may be used as chemical adjuvants: acetic, sulfuric, formic tannic, tartaric acid . . ., urea, thiourea, ammonium salts such as ammonium tartrate, sodium salts such as disodium phosphate, sodium carbonate and other adjuvants such as glycerine, Glycine, which is the trademark of a polyglycol derivative available from General Dyestuff Corp. and used for pasting acid and basic dyes and as a printing assistant for textiles, resorcin, glucose, chromium acetate, universal mordants and the like.

As binders and thickeners there may be used natural and synthetic gums and acid- or heat-solubilized starches.

According to a preferred method of setting the invention into effect, the dye element is prepared in a two-stage process: in a first step a color paste is produced without water by grinding in the cold state, which paste comprises coloring agents or pigments and the usual fillers and adjuvants, preferably accounting for 50% of the compound, as well as fluid polyethylene glycol, having a molecular weight of approximately from 400–2,000, accounting for the remaining 50% of the paste. In a second step which is a kneading operation in the cold state, the paste obtained is thickened by means of thickening agents and solid polyethylene glycol, having a molecular weight of from 2,000–4,000 or more. A preferred rate of proportion is the following: 10–30% color paste, 40–60% gums and 50–10% polyethylene glycol.

The following is an example of a composition according to the invention, given for purposes of illustration.

A dye composition for printing in polychrome is prepared, having the following composition:

Composition I

| Components: | Parts by weight |
| --- | --- |
| Coloring agent: | |
|    Ecarlate neutrogent | 12 |
| Adjuvants: | |
|    Glycerine | 24.6 |
|    Soda at 40° Bé | 4.2 |
| Binders and thickening agents: | |
|    Crystallized gum | 30 |
|    Gum arabic | 40 |
| Polyethylene glycol (mol. weight 400) | 10 |
| Polyethylene glycol (mol. weight 4,000) | 10 |

A color paste is prepared by grinding in the cold state (room temperature) the coloring agent, the adjuvants and the polyethylene glycol (molecular weight 400) in a grinder equipped with 3 crushing rollers, until a homogeneous semi-liquid paste is obtained. Grinding is discontinued as soon as a transparency test of a paste sample, inserted between two glass plates, reveals that all lumps or specks have disappeared. Said operation takes about 30 minutes to 1 hour.

The color paste thus obtained is mixed with thickeners and polyethylene glycol (molecular weight 4,000) in a two-blade "Z" mixer, manufactured by the firm Werner-Pfleiderer, until a homogeneous, smooth and solid compound is obtained. Said operation lasts about 10–30 minutes.

Subsequently the mixture is subjected to after-treatments and to shaping, such as laminating, pressing, drawing, compression, molding, cutting, stamping, granulation or spinning, etc., with a view of obtaining dye elements in the shape of blocks, plates, sticks, yarns, granulates, powder or any other desired configuration.

The dye elements obtained may be arranged together with other dye elements of different colors according to automatic or mechanical methods (Linotype and the like) to form a flat or cylindrical pattern for printing in polychrome.

Other dye elements having the following compositions may be prepared by means of the above described process.

*Composition II*

Constituents: Parts by weight
Coloring agent: Solasol, Sandosol or Antrosol _ 85
Adjuvant:
   Glycerine _____ 272
   Sodium carbonate _____ 17
Thickening agents:
   Gum arabic _____ 427
   Crystallized gum _____ 256
Polyethylene glycol (mol. weight 1,200) _____ 100
Polyethylene glycol (mol. weight 4,000) _____ 100

According to a modification no fluid polyethylene glycol is used in the grinding step, but either a single solid polyethylene glycol or a mixture of a fluid polyethylene glycol with a solid polyethylene glycol in the kneading step. The following constituents are applied according to said modification:

*Composition III*

Constituents: Parts by weight
Direct coloring agent: Diamine or Chlorantine _____ 240–400
Adjuvant:
   Urea _____ 200
   Disodium phosphate _____ 60
   Glycerine _____ 116
Binders and thickening agents:
   Binding paste (1:2 glycerine/cryst. gum) _____ 300
   Mixture of gum arabic, crystallized gum and solubilized starch _____ 2,400
Polyethylene glycol (mol. weight 4,000) __ 200

*Composition IV*

Constituents: Parts by weight
Coloring agent: Celliton, Cibacet or Artisil _ 10
Adjuvants: glycerine _____ 4
Binders and thickening agents:
   Binding paste (1:2 glycerine/cryst. gum) _____ 13
   Mixture of gum arabic, crystallized gum, solubilized starch ___ 60–70
1:1 mixture of polyethylene glycols (mol. weights 400/4,000) _____ 4–6

*Composition V*

Constituents: Parts by weight
Acid dye: Carbolan _____ 8–10
Adjuvants:
   Glycerine _____ 5-7-8
   Tartaric acid _____ 5–7

Constituents Parts by weight
Binders and thickening agents:
   Binding paste (1:2 glycerine/cryst. gum) _____ 13–14
   Mixture of gum arabic, solubilized starch _____ 60–70
Polyethylene glycol (mol. weight 4,000) __ 7–10

The novel dye elements according to the present invention can be used used in conventional multicolor printing machines, provided with a flat or cylindrical pattern member.

One of the said machines is described in U.S. Patent No. 1,998,028, and it comprises:

(a) a moistening device provided with wetting rollers, one of which is immersed in a trough containing water;

(b) a printing device arranged remote from the moistening device, comprising a single transfer cylinder supporting the solid, soluble multicolor dye elements and co-operating with two backing cylinders, so that the strip of fabric to be imprinted describes a substantial arc around the upper backing cylinder;

(c) a device for feeding a strip of fabric to be imprinted first between the rollers of the moistening device so that the strip of fabric is moistened and subsequently between the transfer cylinder and the backing cylinders, intended to transfer the pattern from the transfer cylinder onto the strip of moistened fabric, so that moistening and imprinting of the strip of fabric is carried out successively;

(d) a device supplying a protective liner, generally consisting of a second strip of fabric identical to the strip to be imprinted, with a view of preventing soiling of the latter when it makes contact with the lower backing cylinder, owing to the fact that the coloring agent of the transfer cylinder traverses the moistened fabric and soils the lower backing cylinder.

In operation the strip of fabric to be printed, together with the protective liner, first of all enters the wetting trough and then passes between wringer rollers and any excess moisture is evaporated during the long travel from said wringer rollers to the transfer cylinder. The thus appropriately moistened assembly of the strip to be printed and its liner is then applied by the backing rollers against a portion of the surface of the transfer cylinder. Impression is obtained by solubilization of the surface of the dye elements provided on the transfer cylinder when they come into contact with the moistened surface of the strip to be imprinted and transfer of the solubilized dye composition onto said strip takes place.

Owing to the excellent fineness and the instantaneous solubility of the novel dye elements according to the invention, they can be used in a novel multicolor printing machine which is less complicated than conventional machines of the same kind.

To this end the multicolor printing machine according to the invention comprises on the one hand a single transfer cylinder which is rotationally mounted about a horizontal axis and is provided wtih a cylindrical pattern member, formed of solid, soluble dye elements according to the invention, arranged to form the pattern to be reproduced, and on the other a backing-wetting cylinder, rotationally mounted about a horizontal axis, arranged immediately below the transfer cylinder. Means are provided for forcing said backing-wetting cylinder against the transfer cylinder. A trough containing the solvent for the dye elements is provided underneath the backing-wetting cylinder, which is partly immersed in said solvent, thus picking up solvent during its rotation. A cleaning device is mounted in said trough, immersed in the solvent, which means are intended to clean the surface of the backing-wetting cylinder. Furthermore there are provided feed-in means for the strip of fabric to be imprinted, so that it passes between the transfer cylinder and the backing-wetting cylinder in such a way that the solvent found on the latter is transferred to said strip, thus wetting the same, and subsequently to the pattern member, thus solubilizing the surface of the dye elements and transferring the solubilized dyes to said strip of fabric. Thus wetting and imprinting of said strip are effected simultaneously.

Figure 2:
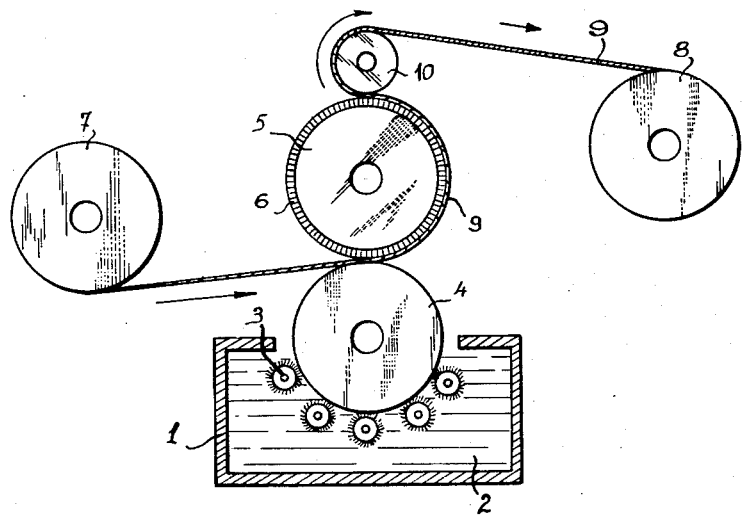

The invention will be more easily understood by means of the following description, wherein reference is made to the accompanying drawing, wherein FIG. 1 is a view of the complete printing machine, according to the invention, FIG. 2 is a view of the modification of the machine shown in FIG. 1.

In FIG. 1 there is shown a trough 1, filled with water or an organic solvent 2 and being equipped with rotating brushes 3 for cleaning the wetting cylinder 4. The wetting roller 4 which equally serves as a backing roller, is arranged immediately below the transfer roller 5, carrying the pattern member 6 consisting of solid, soluble dye elements of the type described in the preceding example, which are arranged in accordance with the pattern to be reproduced. The strip 9 to be imprinted, which may be a strip of fabric, is continuously fed in from reel 7 and passes between transfer cylinder 5 and backing-wetting cylinder 4, both being driven in synchronism by motors not shown in the drawing. The strip is wetted and imprinted simultaneously and is then taken up by reel 8. While rotating, wetting cylinder 4 is cleaned by brushes 3. Owing to the fact that its surface is in a continuously clean condition, a protective liner can be dispensed with.

According to the modified embodiment of FIG. 2, said machine is moreover provided with an auxiliary backing cylinder 10, arranged above transfer cylinder 5 and intended to maintain the strip 9 to be imprinted in contact with the transfer cylinder over a long distance of the surface of the latter, thus increasing the contact area of the strip 9 with the transfer cylinder, which is necessary when thick material is to be imprinted.

What I claim is:

A method of preparing a novel solid, soluble dye element, characterized in that in a first step a color paste is formed without water by grinding in the cold state, which paste comprises coloring agents, fillers and adjuvants, as well as a fluid polyethylene glycol having a molecular weight in the range between approximately 400 and 2,000, and being present in an amount constituting approximately 50% of said paste, and that in a second step the color paste obtained is thickened by adding binders and thickening agents and kneading same in the cold state together with a solid polyethylene glycol, having a molecular weight in the range between approximately 2,000 and 4,000 or more, a preferred rate of proportion being 10–30% color paste, 40–60% binders and thickening agents, and 50–10% solid polyethylene glycol.

References Cited by the Examiner

UNITED STATES PATENTS

| 336,086 | 2/1886 | Boyd | 101—132.5 |
| 1,998,028 | 4/1935 | Sark | 101—134 |
| 2,835,604 | 5/1958 | Aronberg | 106—19 X |
| 3,056,644 | 10/1962 | Radley et al. | 8—93 |

FOREIGN PATENTS 1,085,282  7/1954  France.

DAVID KLEIN, *Primary Examiner.*